United States Patent [19]
Moore et al.

[11] Patent Number: 6,003,373
[45] Date of Patent: Dec. 21, 1999

[54] CLOSED LOOP RESONANT ROTATION RATE SENSOR

[75] Inventors: Robert H. Moore, Antioch; Michael R. Layton, Clayton, both of Calif.

[73] Assignee: BEI Sensors & Systems Company, Inc., Concord, Calif.

[21] Appl. No.: 09/172,099

[22] Filed: Oct. 13, 1998

Related U.S. Application Data

[63] Continuation-in-part of application No. 08/827,836, Apr. 11, 1997, Pat. No. 5,850,035, which is a continuation of application No. 08/475,401, Jun. 7, 1995, abandoned.

[51] Int. Cl.$^6$ .................................................. G01P 9/04
[52] U.S. Cl. ........................................................ 73/504.16
[58] Field of Search ........................... 73/504.12, 504.13, 73/504.14, 504.15, 504.16, 504.04; 310/329, 370

[56] References Cited

U.S. PATENT DOCUMENTS

| | | | |
|---|---|---|---|
| 4,654,663 | 3/1987 | Alsenz et al. | 73/504.14 |
| 4,898,032 | 2/1990 | Voles | 73/504.16 |
| 5,056,366 | 10/1991 | Fersht et al. | 73/504.15 |
| 5,400,269 | 3/1995 | White et al. | 73/504.12 |

*Primary Examiner*—John E. Chapman
*Attorney, Agent, or Firm*—Stephen M. Knauer; Flehr Hohbach Test Albritton & Herbert LLP

[57] ABSTRACT

A closed loop sensor that utilizes a piezoelectric structure. In one embodiment, drive/non-control electrodes apply drive voltages to the piezoelectric structure and drive/control electrodes apply drive/control voltages to the piezoelectric structure to cause drive mode displacement of the piezoelectric structure and cancel motion induced pickup mode and quadrature displacements of the piezoelectric structure. In another embodiment, pickup/control electrodes detect a pickup signal from the piezoelectric structure corresponding to the motion induced pickup mode and quadrature displacements and apply a control signal to the piezoelectric structure so as to cancel these displacements. In still another embodiment of the invention, an optical sensing device optically senses the motion induced pickup mode and quadrature displacements and control electrodes apply a control signal to the piezoelectric structure so as to cancel them.

10 Claims, 15 Drawing Sheets

CLOSED LOOP RESONANT ROTATION RATE SENSOR

This patent application is a continuation-in-part of U.S. patent application Ser. No. 08/827,836, filed Apr. 11, 1997, now U.S. Pat. No. 5,850,035, which is hereby explicitly incorporated by reference and which is a continuation of U.S. patent application Ser. No. 08/475,401 filed Jun. 7, 1995, abandoned.

The present invention relates generally to motion sensors. Specifically, it pertains to a closed loop resonant rotation rate sensor.

Resonant rotation rate sensors include a vibratory structure, often of a piezoelectric material such as alpha quartz. Electrodes are disposed on the vibratory structure and apply to the vibratory structure a drive signal provided by an electronic oscillator drive circuit. The drive signal drives the vibratory structure into a mode of vibration at its natural frequency. In order to cause this drive mode vibration, the drive circuit senses the mechanical motion of the vibratory structure and excites it electrically in a closed feedback loop.

In the presence of rotation about an axis of the vibratory structure, the drive mode vibration is coupled via the Coriolis effect into another mode of vibration of the vibratory structure. Electrodes disposed on the vibratory structure pickup a signal from the vibratory structure that represents this mode of vibration. The pickup signal is converted by a pickup circuit into a signal that represents the rotation rate of the vibratory structure.

In conventional open loop resonant rotation rate sensors, partial vibration of the structure is often excited when the vibratory structure is forced into vibration in the drive mode (even in the absence of rotation). This partial vibration is known as quadrature vibration since it is 90° out of phase with the pickup mode vibration caused by rotation of the sensor.

Quadrature vibration may arise for a number of reasons. For example, the resonant frequency of the pickup mode may be only about 100 Hz away from the resonant frequency of the drive mode and the vibratory structure may not be perfectly balanced.

In a typical open loop resonant rotation rate sensor, epoxy or gold is deposited on the structure and trimmed in order to balance the structure so that the quadrature vibration is canceled at ambient temperatures. However, most of these rotation rate sensors exhibit a strong linear dependence of quadrature vibration with temperature. This linear dependence is typically about 1°/second/° Celsius. As a result, the vibratory structure can exhibit a large quadrature vibration which, together with the large rotation induced vibration, is represented by the pickup signal picked up from the structure by the pickup electrodes. In addition, because of the large quadrature component of the pickup signal, a small phase error in the synchronous demodulator of the rotation rate sensor can result in unacceptably high leakage of quadrature bias offsets into the output rate signal.

Moreover, with open loop resonant rotation rate sensors, the signal-to-noise ratio can be improved by bringing the resonant frequency of the rotation induced vibration close to the resonant frequency of the drive mode vibration. However, this results in reduced bandwidth.

An attempt at solving the foregoing problems is described in U.S. Pat. No. 5,056,366 issued to Fersht, et al. The Fersht Patent describes a resonant rotation rate sensor that includes control electrodes placed at the base of the drive tines of a double ended tuning fork made of piezoelectric material. The pickup signal detected at the pickup tines is used by a feedback circuit to generate a control signal applied to the base of the drive tines by the control electrodes. The control signal is used to cancel out-of-plane vibration of the drive tines. This is done in order to enhance the signal-to-noise ratio without reducing bandwidth.

However, since the control electrodes are separate from the drive electrodes and located at the base of the drive tines, they are small in comparison to the drive electrodes. Without resorting to excessively high control signal voltages, this means that the control electrodes will only weakly control out-of-plane vibration of the drive tines. As a result, the rotation rate sensor described in the Fersht Patent is not adequate for canceling Coriolis induced (i.e., out of plane) vibrations of the drive tines in response to large rotation rate inputs. Thus, the dynamic range of rotation rates over which this rotation rate sensor can be used is rather limited.

Furthermore, the location of the control electrodes at the base of the drive tines necessitates moving the drive electrodes further out on the drive tines. This has the undesirable effect of degrading the coupling of the drive electrodes to the drive mode of vibration and/or increasing the coupling of the drive electrodes to undesired modes of vibration.

A similar approach is described in U.S. Pat. No. 4,898,032 issued to Voles. The rotation rate sensor in this approach also includes, in addition to drive electrodes, control electrodes disposed on the drive tines of a double ended tuning fork. The quadrature component of the pickup signal detected at the pickup tines of the tuning fork is used to generate a control signal applied to the control electrodes to make the tuning fork torsionally balanced. But, since the control electrodes are separate from the drive electrodes, the rotation rate sensor described in Voles suffers from the same types of problems described above for the rotation rate sensor described in Fersht.

The foregoing problems are solved by a motion sensor in accordance with the present invention. This sensor may have several embodiments.

In one embodiment of the present invention, the sensor includes a piezoelectric structure, a sensor circuit, drive/non-control electrodes, drive/control electrodes, and either pickup electrodes or an optical sensing device. The sensor circuit generates drive voltages and drive/control voltages. Each of the drive/control voltages includes a drive component and a control component. The drive/non-control electrodes are coupled to the sensor circuit to apply the drive voltages to the piezoelectric structure while the drive/control electrodes are coupled to the sensor circuit to apply the drive/control voltages to the piezoelectric structure. The pickup electrodes or an optical sensing device provides a pickup signal corresponding to motion induced pickup mode and quadrature displacements of the piezoelectric structure. The sensor circuit is responsive to the pickup signal to generate an output signal corresponding to the motion induced pickup mode displacement. The drive/non-control and drive/control electrodes are disposed on the piezoelectric structure such that the drive voltages and the drive components of the drive/control voltages cause drive mode displacement of the piezoelectric structure and the control components of the drive/control voltages cancel the motion induced pickup mode and quadrature displacements.

In another embodiment of the invention, the sensor comprises a piezoelectric structure, drive electronics, drive electrodes, pickup/control electrodes, and pickup/control electronics. The drive electronics generate a drive signal which is applied to the piezoelectric structure by the drive electrodes to cause drive mode displacement of the piezoelectric structure. The pickup/control electrodes are disposed on the piezoelectric structure to detect a pickup signal from the structure corresponding to pickup mode and quadrature displacements of the structure. The pickup/control electronics are coupled to the pickup/control electrodes and are responsive to the pickup signal to generate a control signal having opposite polarity to the pickup signal and corresponding to the pickup mode and quadrature displacements of the structure. The pickup/control electrodes are also coupled to the pickup/control electronics to apply the control signal to the structure so as to cancel the pickup mode and quadrature displacements of the structure.

In still another embodiment of the invention, the sensor comprises a piezoelectric structure, drive electronics, drive electrodes, an optical sensing device, and pickup electronics. The drive electronics generate a drive signal which is applied to the piezoelectric structure by the drive electrodes to cause drive mode displacement of the piezoelectric structure. The optical sensing device optically senses motion induced pickup mode and quadrature displacements of the piezoelectric structure and generates a pickup signal corresponding to these displacements. The pickup electronics are coupled to the optical sensing device and responsive to the pickup signal to generate an output signal corresponding to the motion induced pickup mode displacement of the piezoelectric structure.

As a variation of the embodiment just described, the pickup electronics are responsive to the pickup signal to generate a control signal having opposite polarity to the pickup signal and corresponding to the motion induced pickup mode and quadrature displacements of the piezoelectric structure. The sensor further comprises control electrodes disposed on the piezoelectric structure and coupled to the pickup electronics to apply the control signal to the piezoelectric structure so as to cancel the motion induced pickup mode and quadrature displacements.

Figure 4:
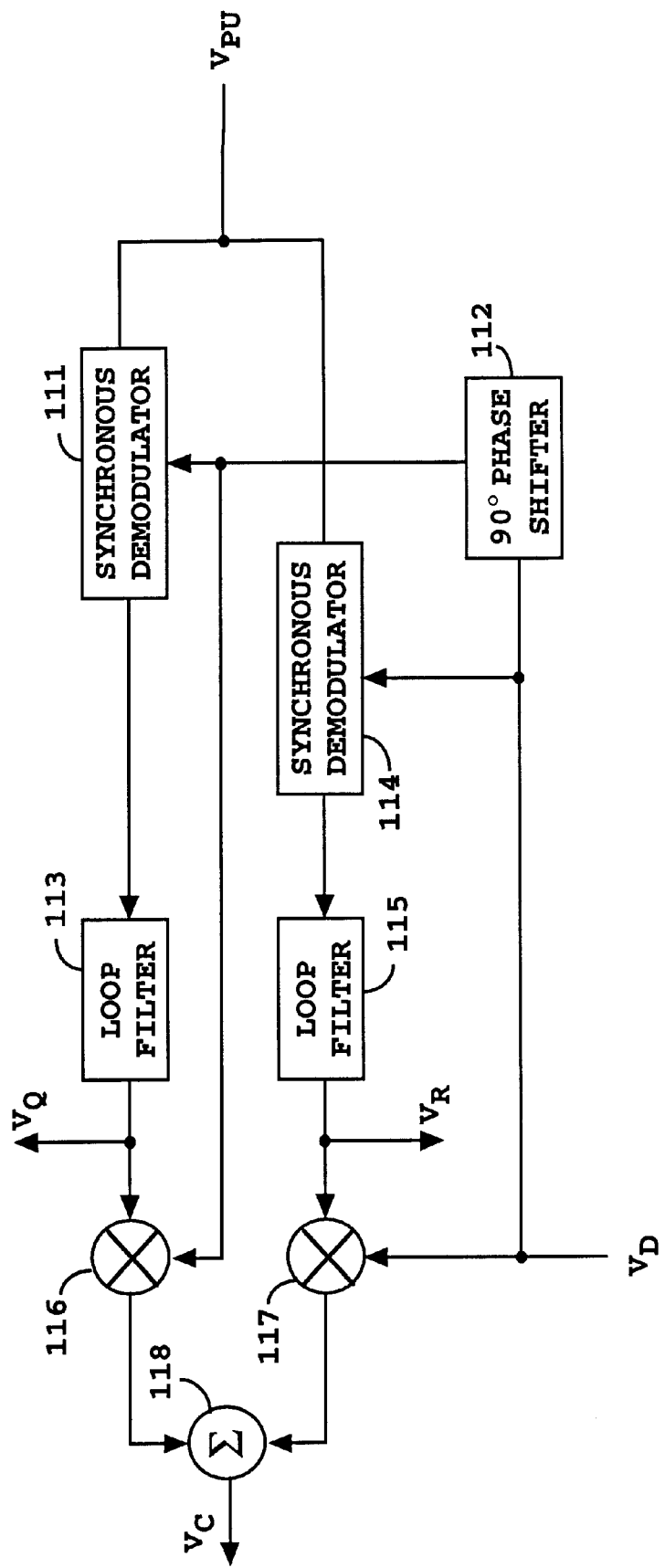

FIG. 4 provides one embodiment of the pickup/control electronics of the rotation rate sensors of FIGS. 1, 6, 9, and 12.

Figure 5:
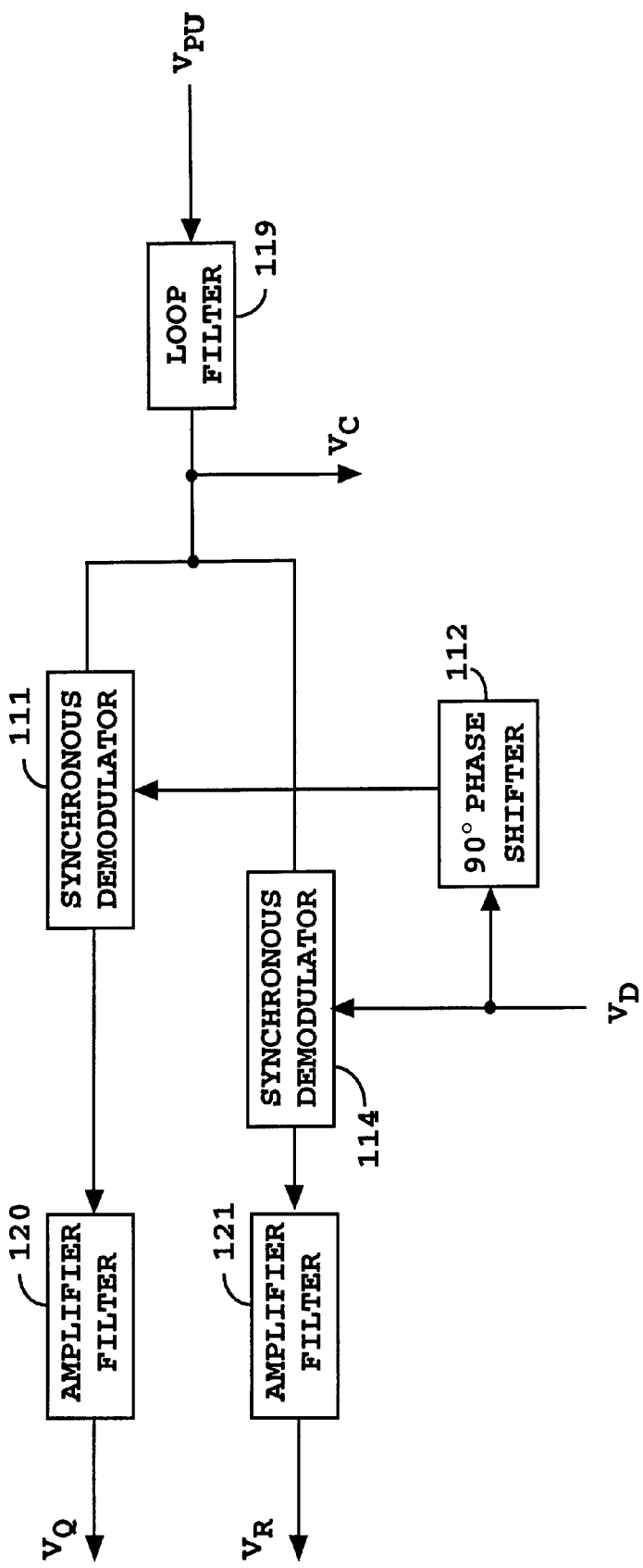

FIG. 5 provides another embodiment of the pickup/control electronics of the rotation rate sensors of FIGS. 1, 6, 9, and 12.

Figure 6:
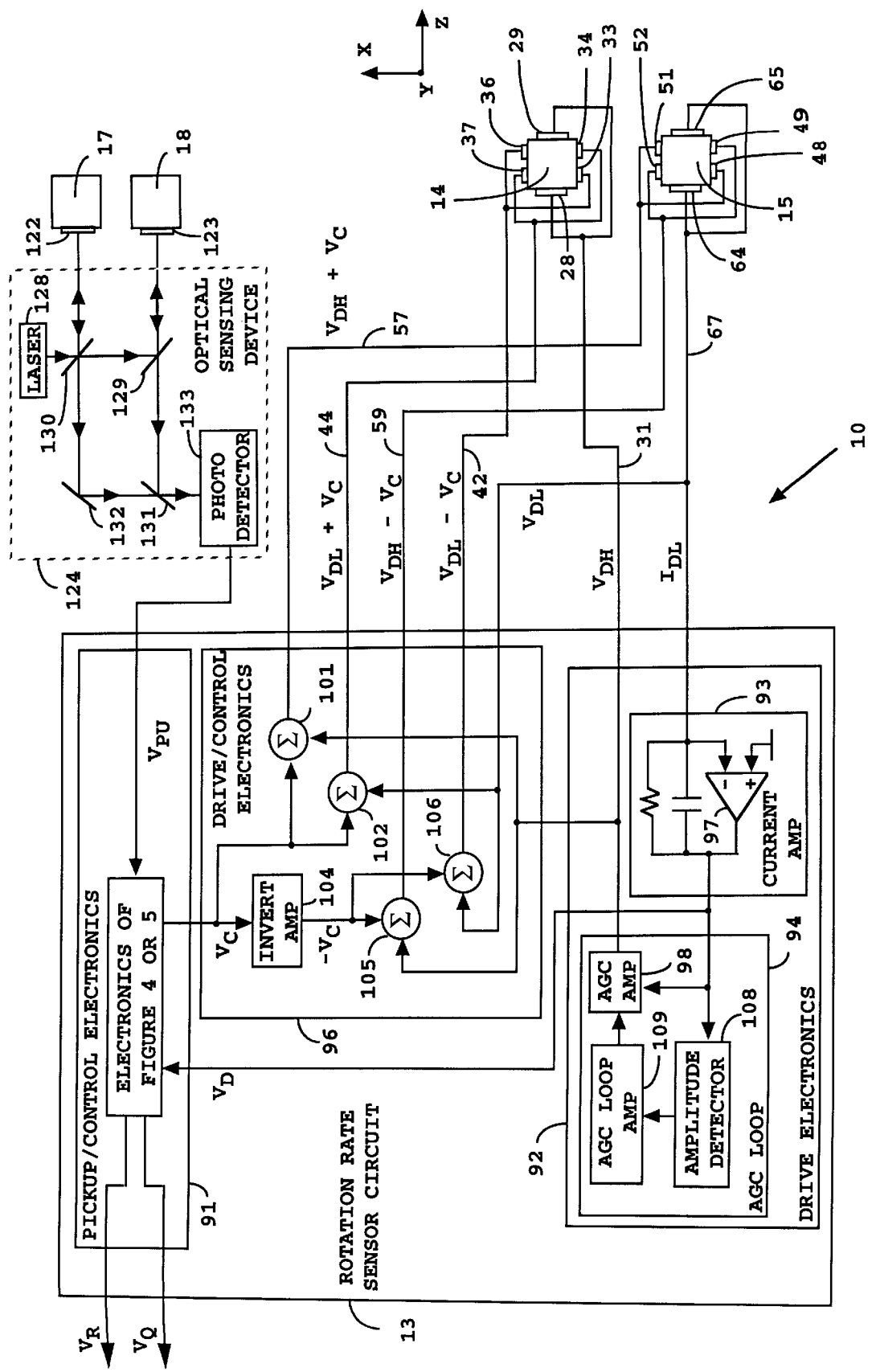

FIG. 6 is a block diagram of another embodiment of the rotation rate sensor in accordance with the present invention.

Figure 7:
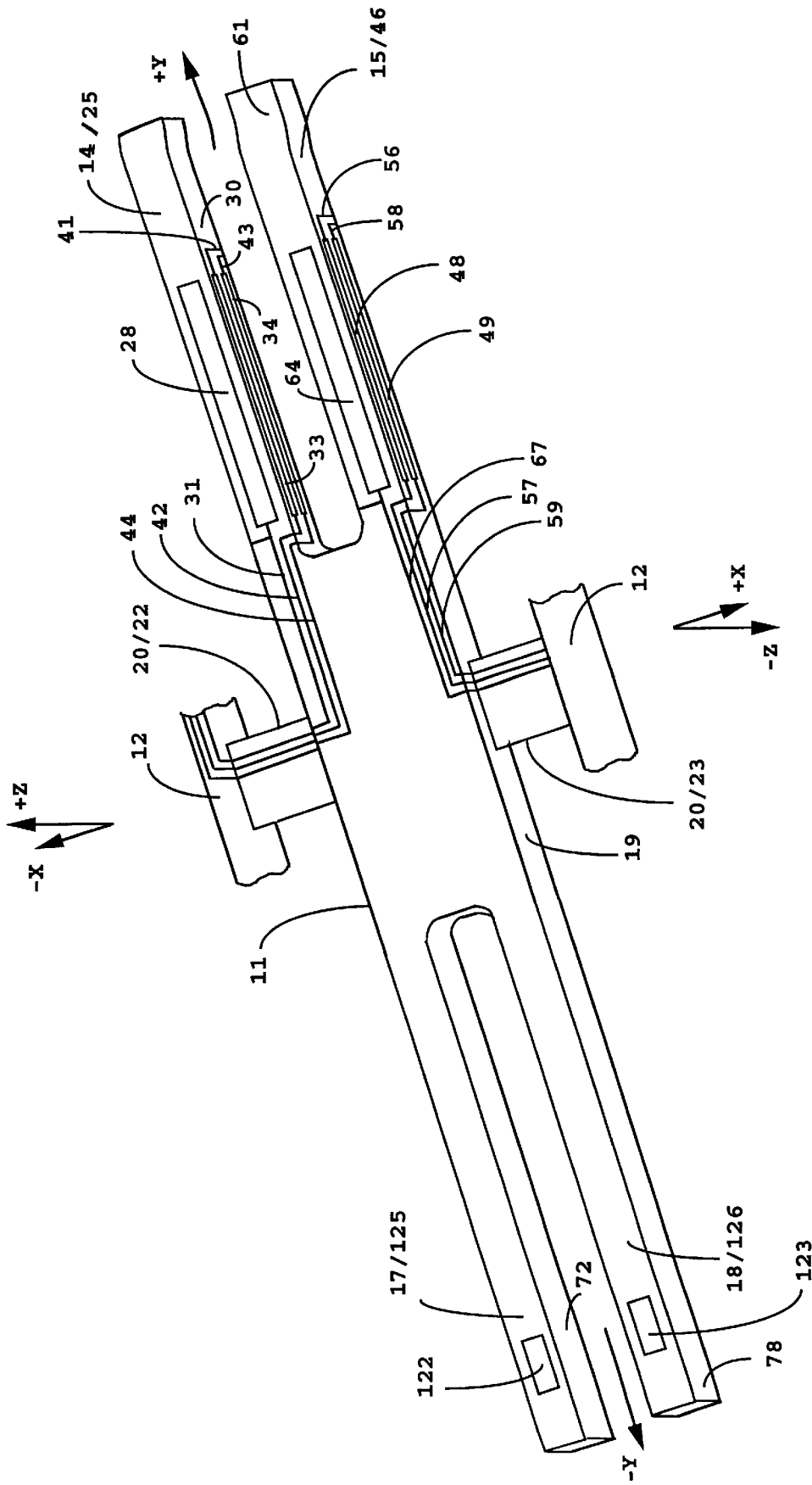

FIG. 7 is a three dimensional top view of the tuning fork of the rotation rate sensor of FIG. 6.

Figure 8:
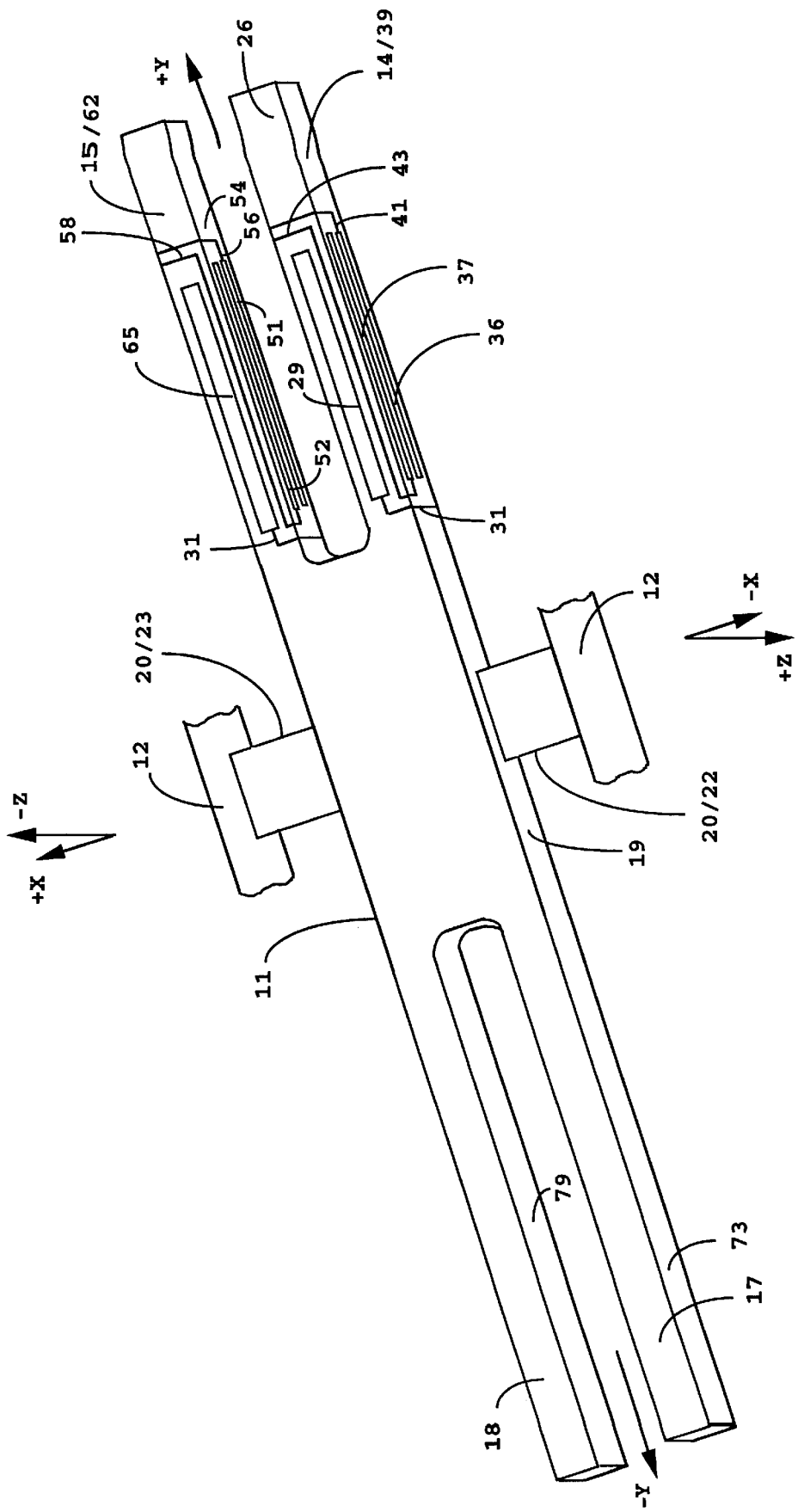

FIG. 8 is a three dimensional bottom view of the tuning fork of the rotation rate sensor of FIG. 6.

Figure 9:
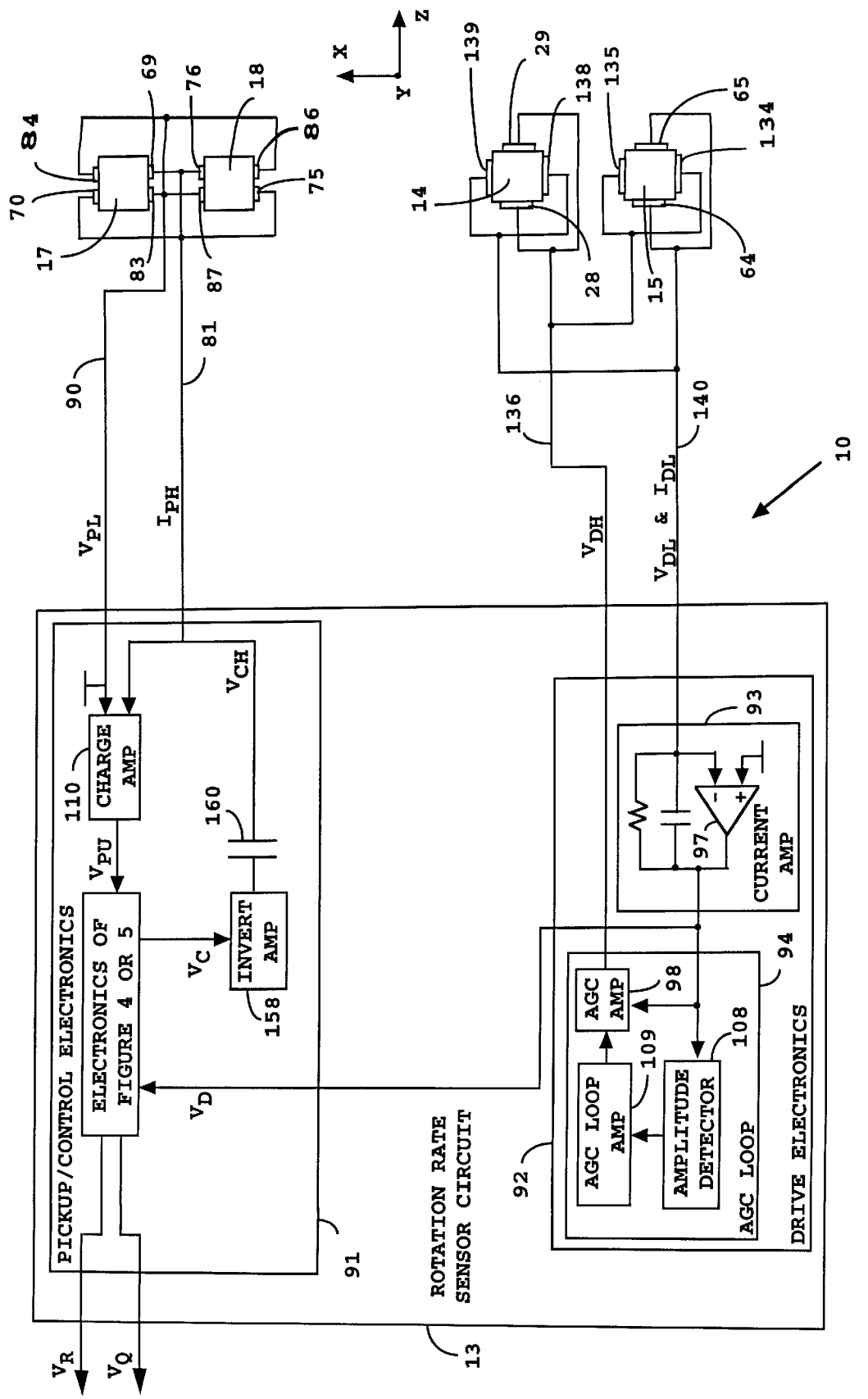

FIG. 9 is a block diagram of still another embodiment of the rotation rate sensor in accordance with the present invention.

Figure 10:
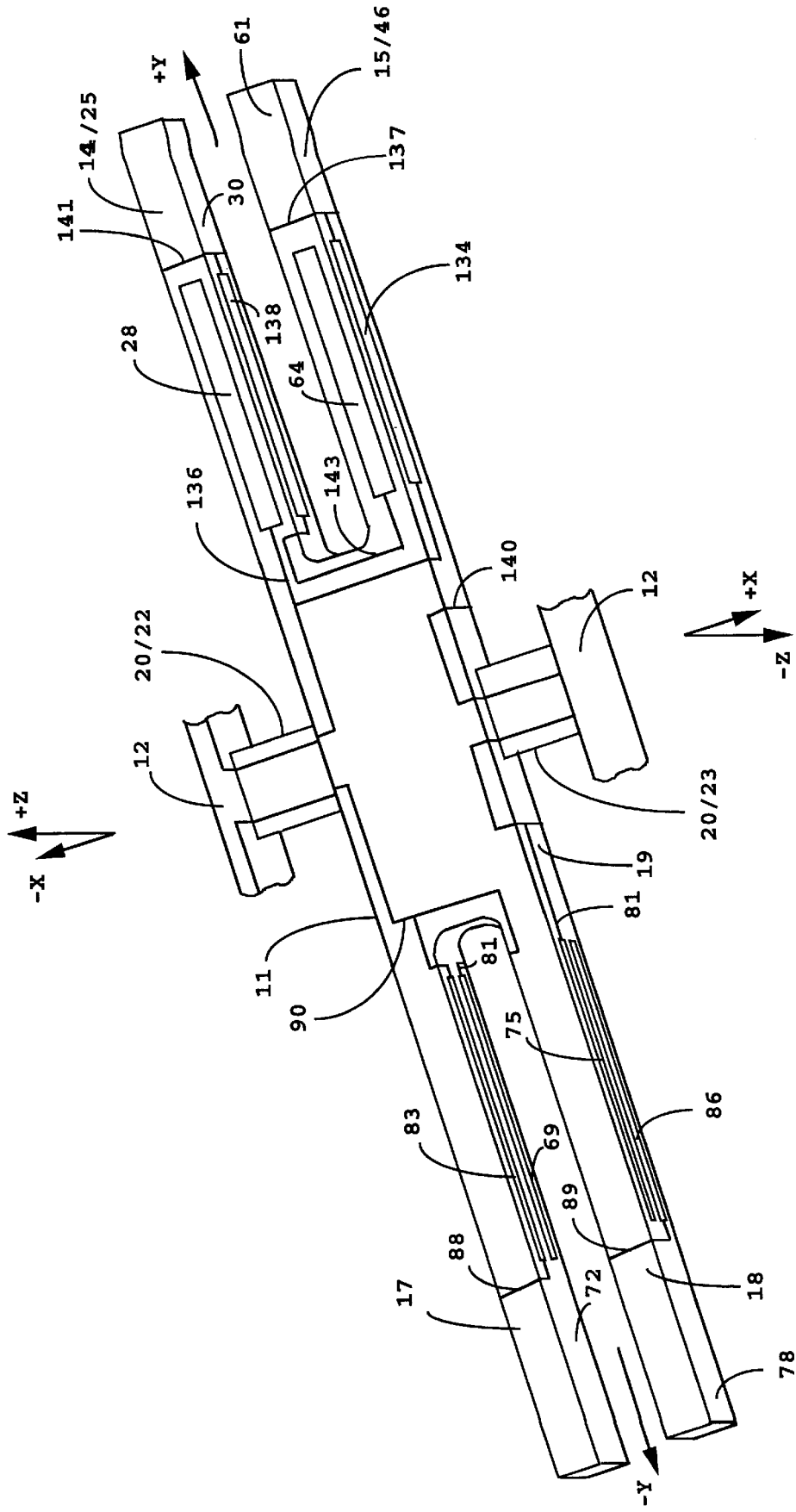

FIG. 10 is a three dimensional top view of the tuning fork of the rotation rate sensor of FIG. 9.

Figure 11:
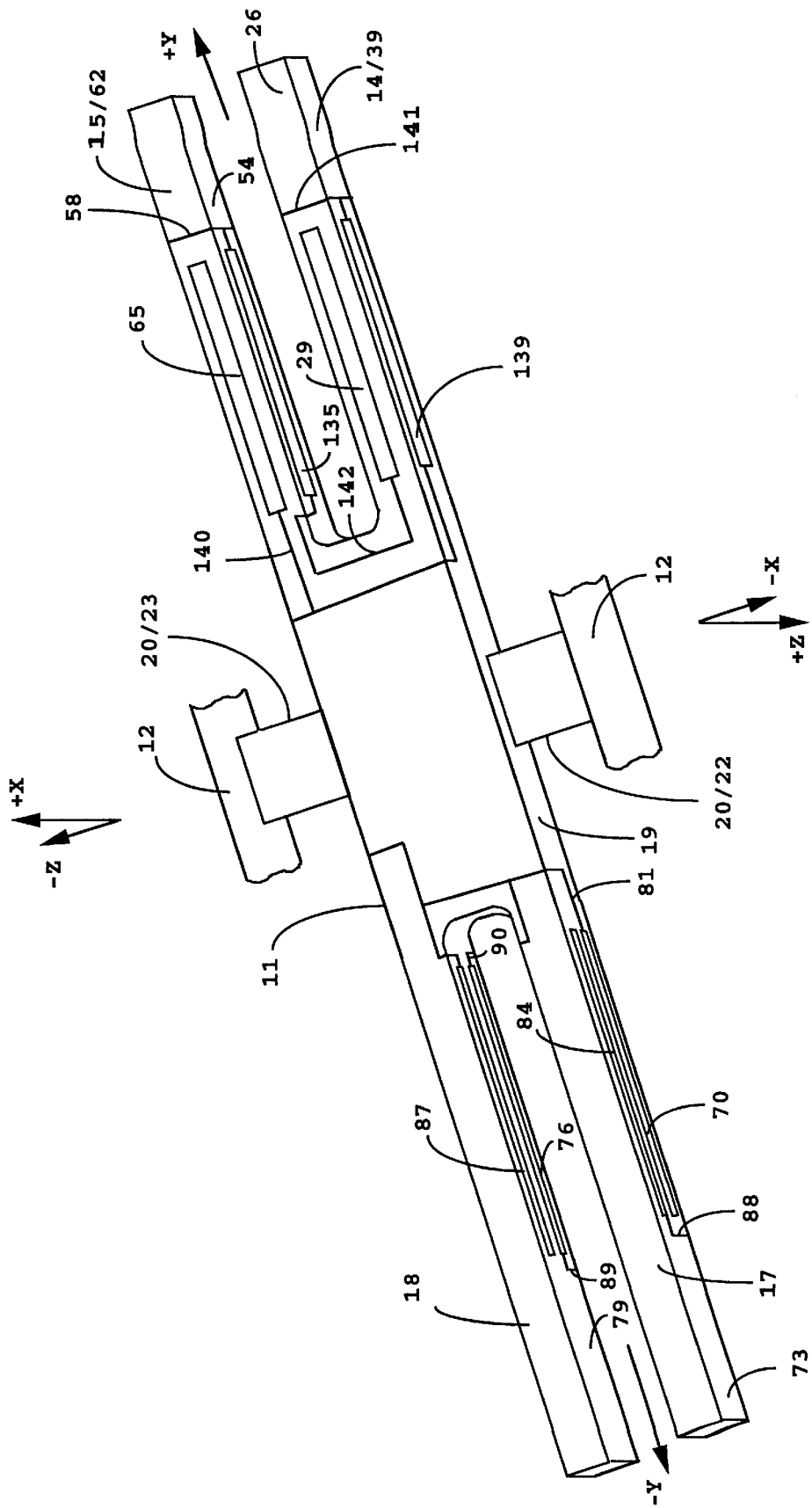

FIG. 11 is a three dimensional bottom view of the tuning fork of the rotation rate sensor of FIG. 9.

Figure 12:
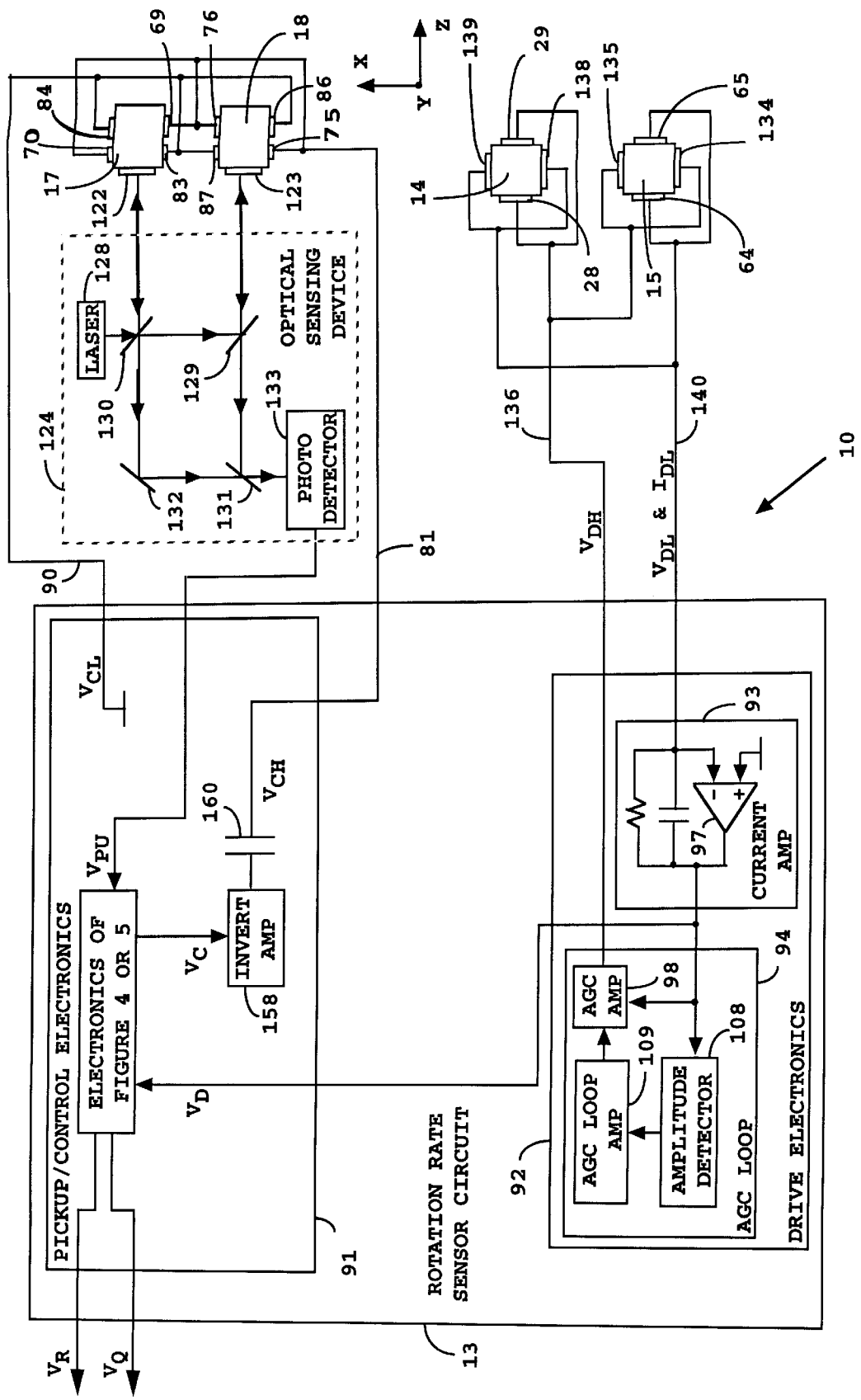

FIG. 12 is a block diagram of yet another embodiment of the rotation rate sensor in accordance with the present invention.

Figure 13:
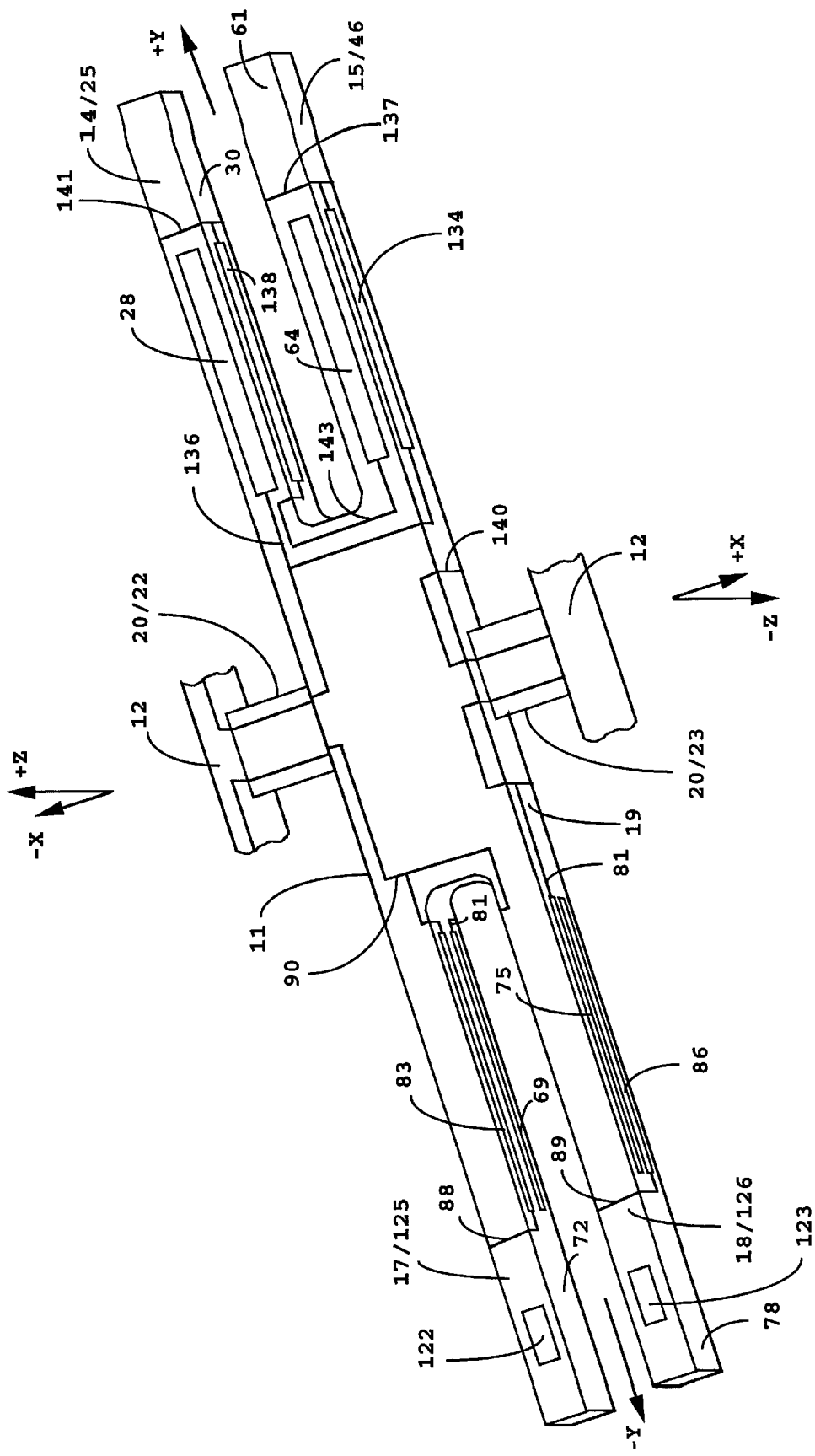

FIG. 13 is a three dimensional top view of the tuning fork of the rotation rate sensor of FIG. 12.

Figure 14:
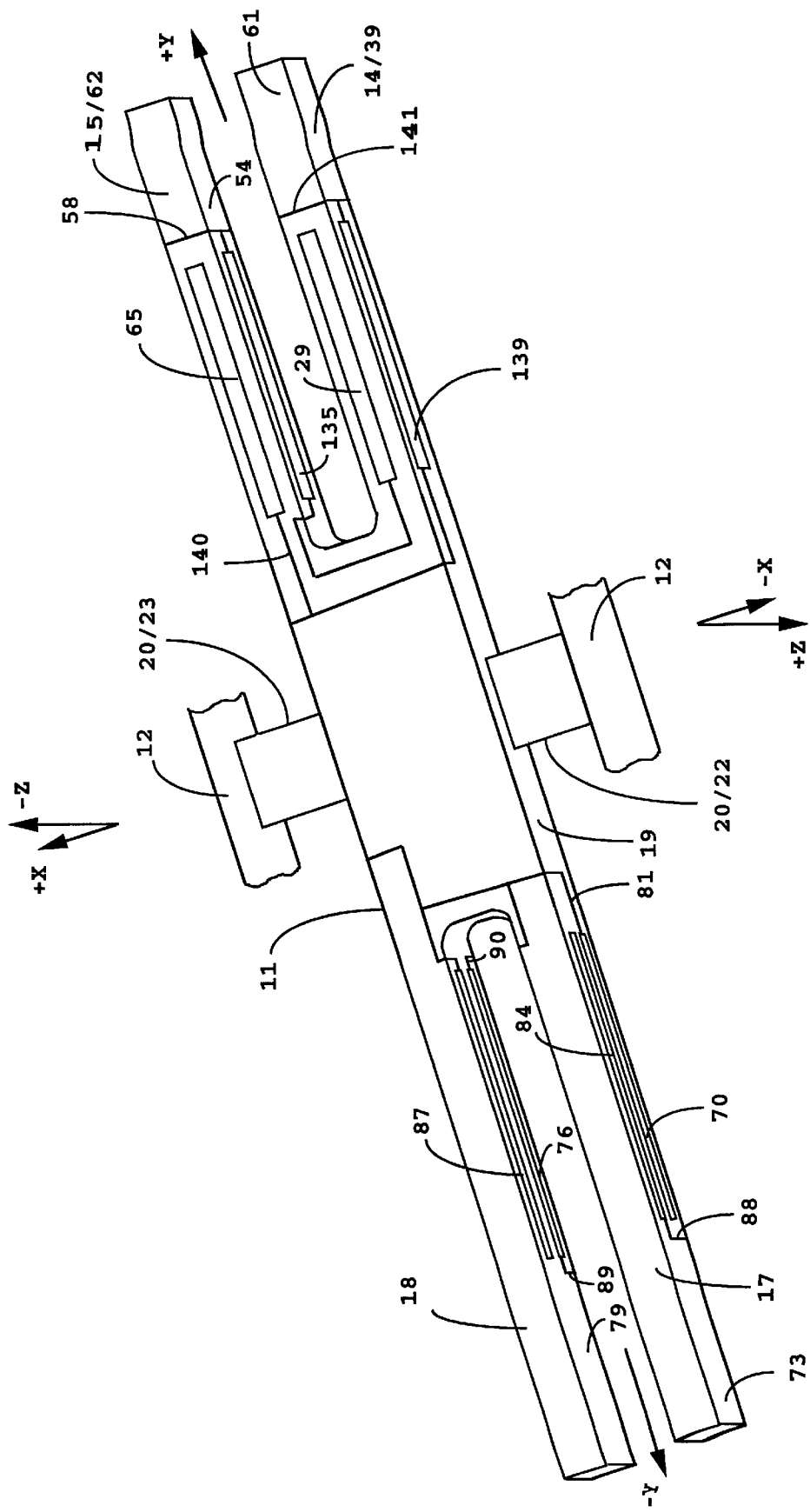

FIG. 14 is a three dimensional bottom view of the tuning fork of the rotation rate sensor of FIG. 12.

Figure 15:
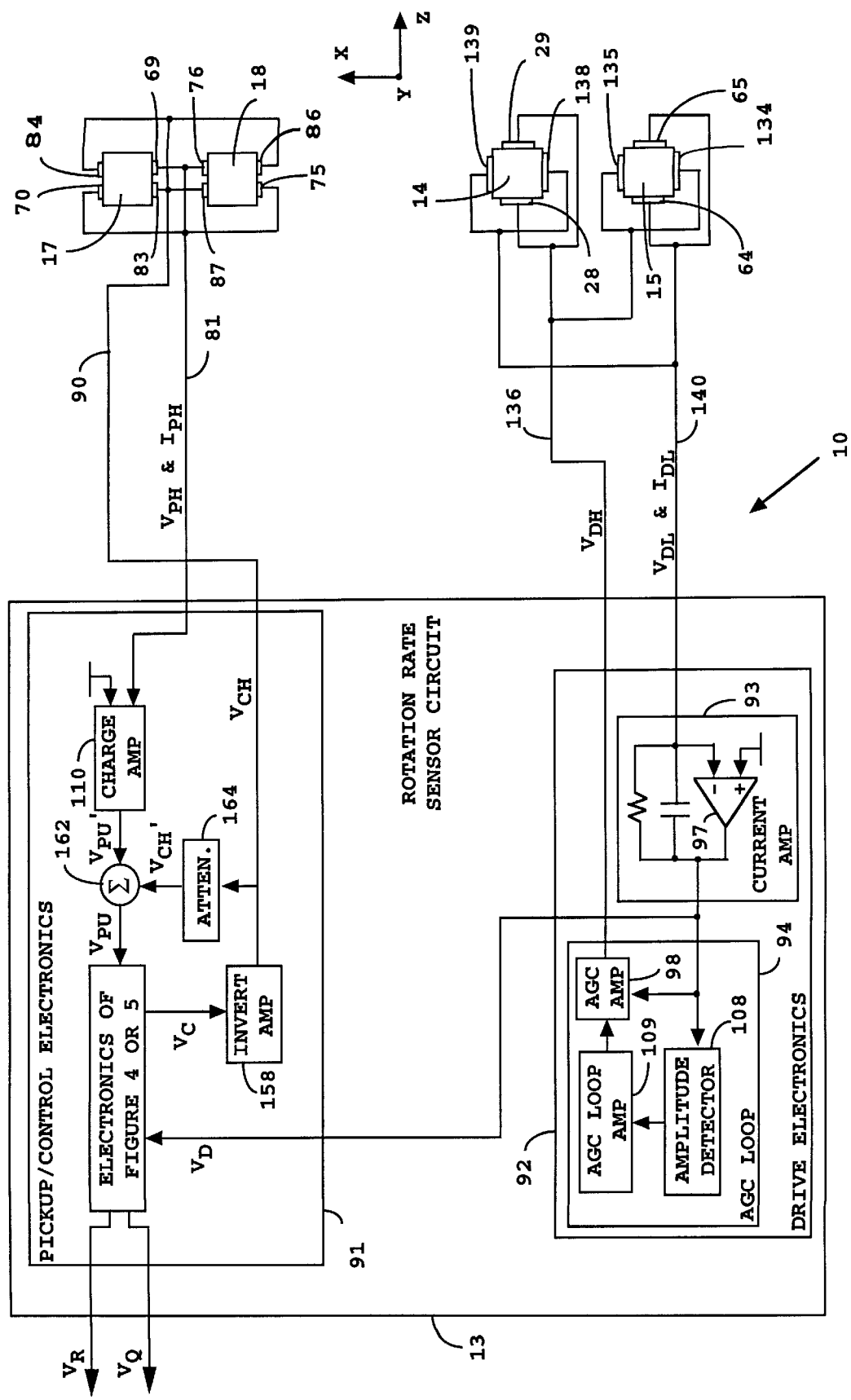

FIG. 15 is a block diagram of a variation of the embodiment of the rotation rate sensor of FIG. 9.

Figure 1:
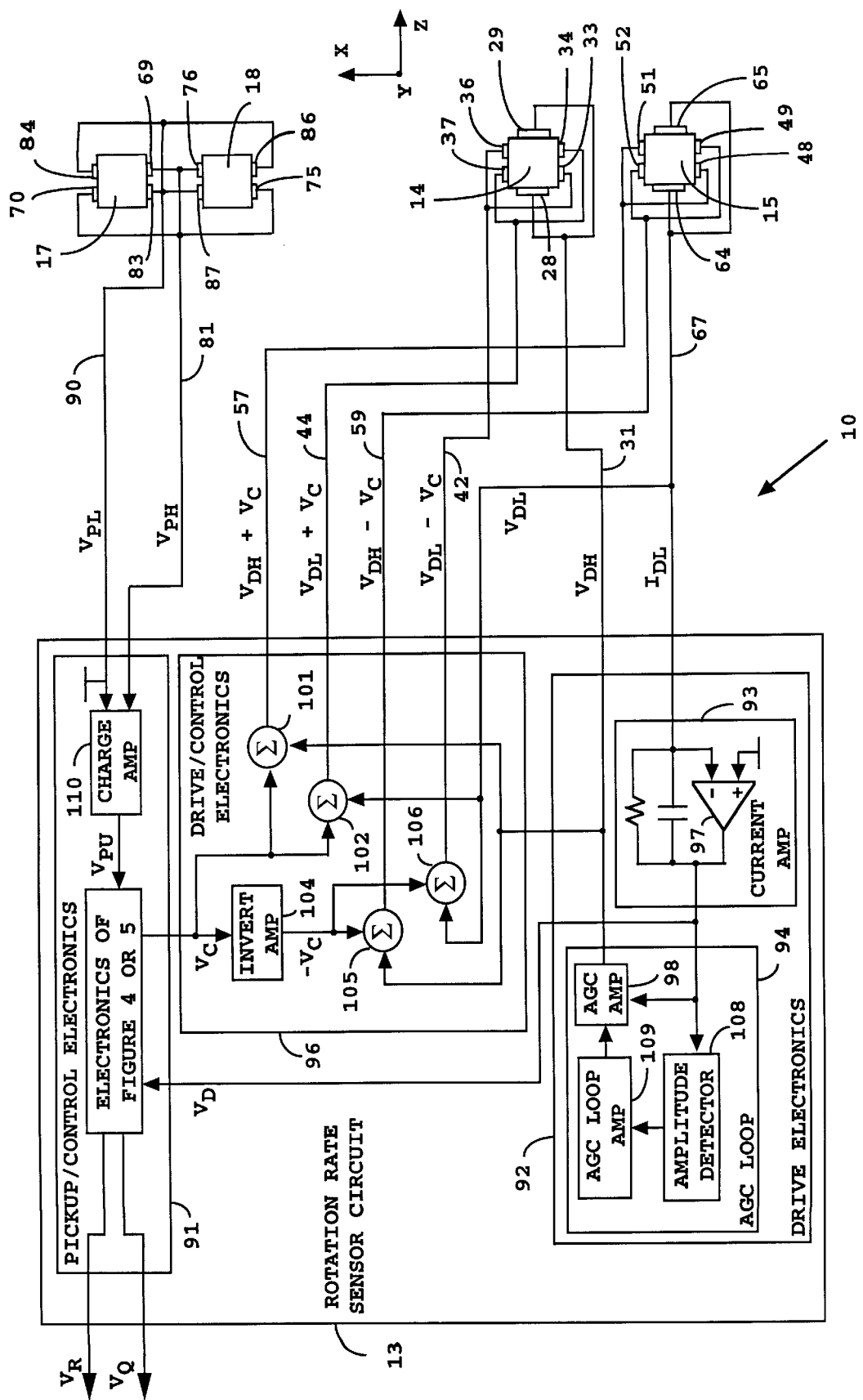
FIG. 1 is a block diagram of a rotation rate sensor in accordance with the present invention.
Figure 2:
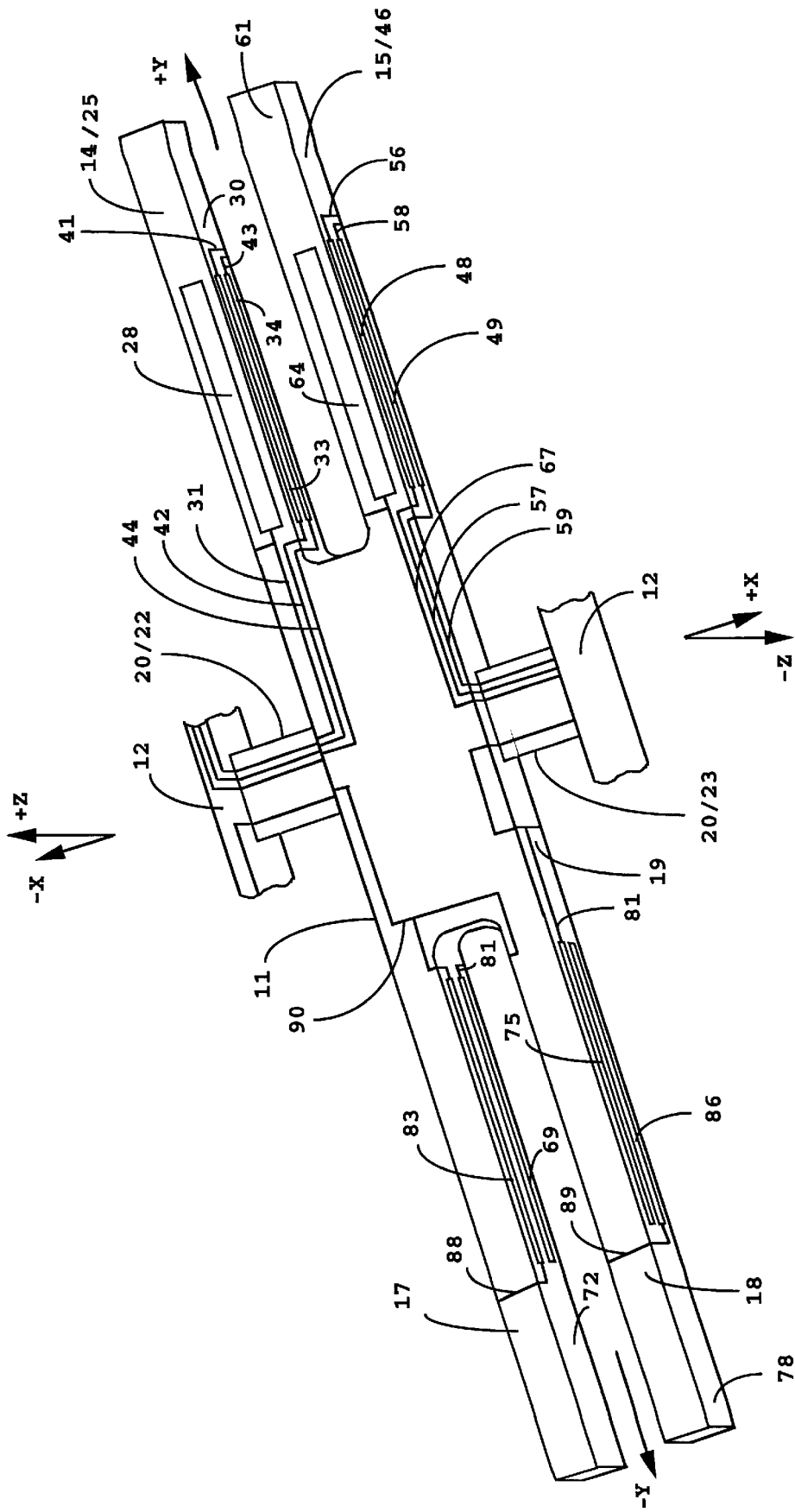
FIG. 2 is a three dimensional top view of the tuning fork of the rotation rate sensor of FIG. 1.
Figure 3:
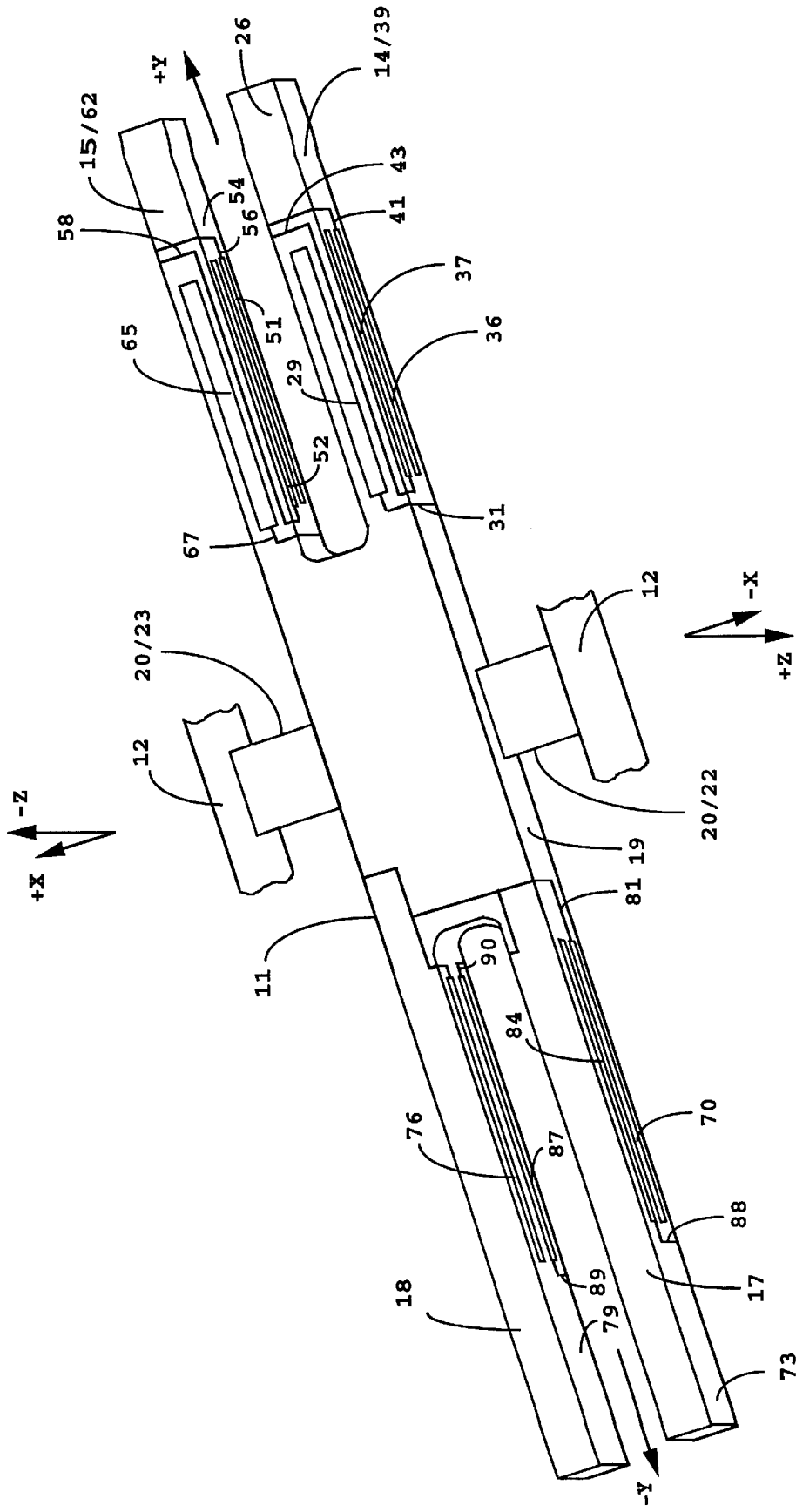
FIG. 3 is a three dimensional bottom view of the tuning fork of the rotation rate sensor of FIG. 1.

Referring initially to FIG. 1, there is shown a rotation rate sensor 10. The rotation rate sensor 10 includes a double ended (i.e. H-shaped) tuning fork 11, as shown in FIGS. 2 and 3. The tuning fork 11 is etched from a single crystal of a piezoelectric material such as alpha quartz. The tuning fork 11 is oriented in the XY plane. The X, Y, and Z axes correspond to the alignment of the molecular structure of the crystal.

The tuning fork 11 includes a pair of drive tines 14 and 15, a pair of pickup tines 17 and 18, a body 19, and a suspension system 20. The drive tines 14 and 15 and the pickup tines 17 and 18 are integrally joined to the body 19. The suspension system 20 includes a pair of bridges 22 and 23 which are integrally joined to the body 19. The bridges 22 and 23 are fixed to the mounting structure 12 of the rotation rate sensor 10 so as to mount the tuning fork 11 to the mounting structure 12. The mounting structure 12 may be integrally formed with the tuning fork 11 from the same piezoelectric material and may itself be mounted to a housing (not shown) for the rotation rate sensor 10. Alternatively, the mounting structure 12 may simply be part of the housing of the rotation rate sensor 10.

As shown in FIGS. 2 and 3, respectively located on the top and bottom surfaces 25 and 26 of drive tine 14 are two drive high/non-control electrodes 28 and 29. These electrodes are coupled together by the lead 31.

Located on side surface 30 of drive tine 14 are a drive low/inverted control electrode 33 and a drive low/control electrode 34. The electrodes 33 and 34 run parallel to each other along the side surface 30. The other drive low/control electrode 36 and the other drive low/inverted control electrode 37 are located on the other side surface 39 of drive tine 14. The electrodes 36 and 37 run parallel to each other along the side surface 39.

The electrodes 33 and 36 are connected together by the lead 41 and are both coupled to the lead 42 which is connected to the electrode 33. The electrodes 34 and 37 are connected together by the lead 43 and are both coupled to the lead 44 which is connected to the electrode 34.

Located on side surface 46 of drive tine 15 are a drive high/control electrode 48 and a drive high/inverted control electrode 49. The electrodes 48 and 49 run parallel to each other along the side surface 46. The other drive high/inverted control electrode 51 and the other drive high/control electrode 52 are located on the other side surface 54 of drive tine 15. The electrodes 51 and 52 run parallel to each other along the side surface 54.

The electrodes 48 and 51 are connected together by the lead 56 and are both coupled to the lead 57 which is connected to the electrode 48. The electrodes 49 and 52 are connected together by the lead 58 and are both coupled to the lead 59 which is connected to the electrode 49.

Respectively located on the top and bottom surfaces 61 and 62 of drive tine 15 are two drive low/non-control electrodes 64 and 65. These electrodes are coupled together by the lead 67.

The two pickup high electrodes 69 and 70 are respectively located on the side surfaces 72 and 73 of pickup tine 17. The other two pickup high electrodes 75 and 76 are respectively located on the side surfaces 78 and 79 of pickup tine 18. The electrodes 69, 70, 75, and 76 are coupled together by the lead 81.

The two pickup low electrodes 83 and 84 are respectively located on the side surfaces 72 and 73 of pickup tine 17. The other two pickup low electrodes 86 and 87 are respectively located on the side surfaces 78 and 79 of pickup tine 18. The electrodes 83 and 84 are connected together by the lead 88 and the electrodes 86 and 87 are connected together by the lead 89. The lead 88 is connected to the electrode 83 which is connected to the lead 90. The electrode 86 is connected to the lead 90. Thus, the electrodes 83, 84, 86, and 87 are all coupled to the lead 90.

FIG. 1 provides a block diagram of the rotation rate sensor circuit 13 of the rotation rate sensor 10. It includes drive electronics 92, control/drive electronics 96, and pickup/control electronics 91.

The drive electronics 92 comprises a current amplifier 93 and an automatic gain control (AGC) loop 94. The drive electronics 92 generates a drive signal $V_{DH}$-$V_{DL}$ including a drive high voltage $V_{DH}$ and a drive low voltage $V_{DL}$.

As is well known in the art, the AGC amplifier 98 of the AGC loop 94 produces the oscillating drive high voltage $V_{DH}$. The drive high voltage $V_{DH}$ is provided to the lead 31 and applied to the drive tine 14 by the electrodes 28 and 29 and is also provided to the control electronics 96.

Furthermore, the current amplifier 93 receives the later described drive low current signal $V_{DL}$ on lead 67. At the same time, the current amplifier 93 is configured so that it provides the drive low voltage $V_{DL}$ to the electrodes 64 and 65 via the lead 67. The electrodes 64 and 65 apply the drive low voltage $V_{DL}$ to the drive tine 15. In addition, the drive low voltage $V_{DL}$ is provided to the drive/control electronics 96.

The pickup/control electronics 91 receives via lead 81 the later described pickup high charge voltage $V_{PH}$ picked up by the pickup high electrodes 69, 70, 75, and 76 from the pickup tines 17 and 18. In response, it produces the later described control voltage $V_C$.

The drive high voltage $V_{DH}$ and the control voltage $V_C$ are summed together by the summer 101 of the drive/control electronics 96 to form the drive high/control voltage $V_{DH}$+$V_C$. Thus, the drive high/control voltage $V_{DH}$+$V_C$ has as the drive component the drive high voltage $V_{DH}$ and as the control component the control voltage $V_C$. The drive high/control voltage $V_{DH}$+$V_C$ is provided to the lead 57 and applied to the drive tine 15 by the electrodes 48 and 51.

The drive low voltage $V_{DL}$ and the control voltage $V_C$ are summed together by the summer 102 of the drive/control electronics 96 to form the drive low/control voltage $V_{DL}$+$V_C$. Thus, the drive component of the drive low/control voltage $V_{DL}$+$V_C$ is the drive low voltage $V_{DL}$ and the control component is the control voltage $V_C$. The drive low/control voltage $V_{DL}$+$V_C$ is provided to the lead 44 and applied to the drive tine 14 by the electrodes 34 and 37.

The control voltage $V_C$ is inverted by the inverting amplifier 104 of the drive/control electronics 96 to produce the inverted control voltage $-V_C$ (which has opposite polarity to the control voltage $V_C$). The drive low voltage $V_{DL}$ and the inverted control voltage signal $-V_C$ are summed together by the summer 106 of the drive/control electronics 96 to form the drive low/inverted control voltage $V_{DL}$-$V_C$. Thus, the drive component of the drive low/inverted control voltage $V_{DL}$-$V_C$ is the drive low voltage $V_{DL}$ and the control component is the inverted control voltage $-V_C$. The drive low/inverted control voltage $V_{DL}$-$V_C$ is provided to the lead 42 and applied to the drive tine 14 by the electrodes 33 and 36.

The drive high voltage $V_{DH}$ and the inverted control voltage $V_C$ are summed together by the summer 105 of the drive/control electronics 96 to form the drive high/inverted control voltage $V_{DH}$-$V_C$. Thus, the drive high/inverted control voltage $V_{DH}$-$V_C$ has as the drive component the drive high voltage $V_{DH}$ and as the control component the inverted control voltage $-V_C$. The drive high/inverted control voltage $V_{DH}$-$V_C$ is provided to the lead 59 and applied to the drive tine 15 by the electrodes 49 and 52.

The drive high and low voltages $V_{DH}$ and $V_{DL}$ applied to the drive tines 14 and 15 and the drive components of the drive/control voltages $V_{DH}$+$V_C$, $V_{DH}$-$V_C$, $V_{DL}$+$V_C$, and $V_{DL}$-$V_C$ applied to the drive tines 14 and 15 provide a drive signal $V_{DH}$-$V_{DL}$ which causes strains in the piezoelectric material of the drive tines 14 and 15. This causes vibration (i.e., displacement or motion) of the drive tines 14 and 15 generally in opposite directions in the XY plane at their resonant frequency in the drive mode.

The drive mode vibration of the drive tines 14 and 15 cause oscillating electric fields to be created in the drive tines 14 and 15. The electrodes 64 and 65 together pick up the drive low current signal $I_{DL}$ from the drive tine 15 which is due to the oscillating fields in the drive tine 15. The drive low current signal $I_{DL}$ has an AC current proportional to the drive mode vibration of the drive tines 14 and 15.

The drive low current signal $I_{DL}$ is provided to the current amplifier 93 of the drive electronics 92 which outputs a voltage signal $V_D$ that has an AC voltage proportional to the drive mode vibration of the drive tines 14 and 15. The output voltage signal $V_D$ of the current amplifier 93 is provided to the AGC loop 94 and the pickup/control electronics 91.

The amplitude detector 108 of the AGC loop 94 rectifies the output voltage signal $V_D$ and provides the rectified output to the AGC loop amplifier 109. In response, the AGC loop amplifier 109 outputs a signal which controls the AGC amplifier 98 to generate the drive high voltage $V_{DH}$ so as to keep fixed the velocity of the drive mode vibration of the drive tines 14 and 15. The drive high voltage $V_{DH}$ therefore has an AC voltage that is proportional to the drive mode vibration of the drive tines 14 and 15.

However, partial vibration (i.e., displacement or motion) of the pickup tines 17 and 18 may be excited when the drive tines 14 and 15 are forced into the drive mode vibration. This is the quadrature vibration of the pickup tines 17 and 18 and is 90° out of phase (i.e., in quadrature) with the later discussed rotation induced pickup mode vibration of the pickup tines 17 and 18.

The quadrature vibration occurs when the drive tines 14 and 15 have vibrational components in the YZ plane in addition to the vibrational components in the XY plane. The quadrature creating vibration of the drive tines 14 and 15 in the YZ plane may occur because (1) the resonant frequency of vibration of the pickup tines 17 and 18 in the pickup mode is typically only 100 Hz away from the resonant frequency of the drive mode vibration of the drive tines 14 and 15, and (2) the drive tines 14 and 15 may not be perfectly balanced.

Because of the factors just mentioned, quadrature creating accelerations of the drive tines 14 and 15 occur in opposite directions in the YZ plane and are time-varying. These time-varying accelerations cause the quadrature creating vibration of the drive tines 14 and 15.

As a result of the opposing quadrature creating accelerations, the body 19 of the tuning fork 11 will experience a time-varying torsion. This time-varying torsion is coupled to the pickup tines 17 and 18 and causes them to vibrate generally in opposite directions in the YZ plane at the same frequency at which the drive tines vibrate in the XY plane.

As alluded to earlier, the pickup tines 17 and 18 will vibrate in the pickup mode due to the tuning fork 11 being subjected to an inertial rotation (i.e., motion) about the Y axis. In response to such a rotation, the drive tines 14 and 15 experience generally equal but opposing Coriolis accelerations in the YZ plane. These time-varying Coriolis accelerations cause the drive tines 14 and 15 to vibrate out of the XY plane at the resonant frequency of the drive mode.

Similar to the quadrature creating accelerations of the drive tines 14 and 15, the opposing time-varying Coriolis accelerations result in the body 19 of the tuning fork 1 1 experiencing a time-varying torsion. This time-varying torsion is coupled to the pickup tines 17 and 18 and causes vibration (i.e., displacement or motion) of the pickup tines 17 and 18 generally in opposite directions in the YZ plane in the pickup mode. Like the quadrature vibration, the rotation induced (or motion induced) pickup mode vibration of the pickup tines 17 and 18 takes place at the same frequency at which the drive tines 14 and 15 vibrate. However, as indicated earlier, the rotation induced vibration of the pickup tines 17 and 18 in the YZ plane is 90° out of phase with the quadrature vibration of the pickup tines 17 and 18 in the YZ plane. This 90° phase difference arises because the Coriolis Force is proportional to, and in phase with, tine velocity rather than tine acceleration.

As is well known in the art, when the pickup tines 17 and 18 vibrate in the YZ plane, strains in the piezoelectric material of the pickup tines 17 and 18 are created. These strains cause oscillating electric fields to be generated in the pickup tines 17 and 18.

The pickup/control electronics 91 provides a pickup low voltage $V_{PL}$ in the form of a ground voltage. The pickup low voltage $V_{PL}$ is applied to the pickup tines 17 and 18 by the pickup low electrodes 83, 84, 86, and 87 via the lead 90.

Thus, due to the rotation induced and quadrature vibrations of the pickup tines 17 and 18, the pickup high electrodes 69, 70, 75, and 76 together detect the pickup high voltage $V_{PH}$ which is provided to the pickup/control electronics 91 by the lead 81. The pickup high voltage $V_{PH}$ and the pickup low voltage $V_{PL}$ provide a pickup input signal $V_{PH}$–$V_{PL}$ that represents the summed together charges induced by the time-varying strains in the pickup tines 17 and 18 due to the rotation induced and quadrature vibrations of the pickup tines 17 and 18. Thus, this signal has a rotation induced charge component that corresponds to the rotation induced vibration of the pickup tines 17 and 18 and a quadrature charge component that corresponds to the quadrature vibration of the pickup tines 17 and 18.

The charge amplifier 110 receives the pickup input signal $V_{PH}$–$V_{PL}$ and in response outputs a pickup output signal $V_{PU}$. The pickup output signal $V_{PU}$ has an AC voltage proportional to the sum of the rotation induced and quadrature vibrations of the pickup tines 17 and 18.

FIG. 4 shows one embodiment of the remainder of the pickup/control electronics 91. In this embodiment, the pickup output signal $V_{PU}$ is provided to the synchronous demodulators 111 and 114.

Moreover, the output voltage signal $V_D$ of the current amplifier 93 is received by the 90° phase shifter 112 which shifts the phase of the output voltage signal $V_D$ by 90°. This phase shifted voltage signal is then provided to the synchronous demodulator 111.

The synchronous demodulator 111 uses the phase shifted voltage signal to remove the pickup component from the pickup voltage signal $V_{PU}$ and outputs in response a quadrature DC voltage signal. The quadrature DC voltage signal is filtered by the loop filter 113 to produce the quadrature output signal $V_Q$ which has a DC voltage proportional to the magnitude of the quadrature vibration of the pickup tines 17 and 18.

The synchronous demodulator 114 uses the output voltage signal $V_D$ of the current amplifier 93 to remove the quadrature component of the pickup output signal $V_{PU}$ and output a rate DC voltage signal. The rate DC voltage signal is filtered by the loop filter 115 to produce the rate output signal $V_R$ which represents the rate of rotation of the tuning fork 11 and has a DC voltage that is proportional to the magnitude of the rotation induced vibration of the pickup tines 17 and 18.

In response to the quadrature DC voltage signal and the phase shifted voltage signal output by the 90° phase shifter 112, the modulator 116 produces a quadrature AC voltage signal. Similarly, in response to the rate DC voltage signal and the output voltage signal $V_D$ of the current amplifier 93, the modulator 117 produces a rate AC voltage signal. The quadrature AC voltage signal and the rate AC voltage signal are summed together by the summer 118 to produce the control voltage $V_C$.

FIG. 5 shows another embodiment of the remainder of the pickup/control electronics 91. As in the previous embodiment, the charge amplifier 110 outputs the pickup output signal $V_{PU}$ in response to the pickup input signal $V_{PH}$–$V_{PL}$. But, in this embodiment, the pickup output signal $V_{PU}$ is filtered by the loop filter 119 and the filtered pickup voltage signal is provided to the synchronous demodulators 111 and 114.

Moreover, similar to the previous embodiment, the synchronous demodulator 111 receives the 90° phase shifted version of the output voltage signal $V_D$ while the synchronous demodulator 114 receives the output voltage signal $V_D$.

The synchronous demodulator 111 removes the pickup component from the filtered pickup voltage signal and outputs a quadrature DC voltage signal. The quadrature DC voltage signal is filtered and amplified by the low pass filter amplifier 120 to produce the quadrature output signal $V_Q$.

The synchronous demodulator 114 removes the quadrature component of the filtered pickup voltage signal and outputs a rate DC voltage signal. The rate DC voltage signal is filtered and amplified by the low pass filter amplifier 121 to produce the rate output signal $V_R$.

Referring again to FIG. 1, in response to the control voltage $V_C$ and the drive high and low voltage signals $V_{DH}$ and $V_{DL}$, the drive/control electronics 96 generates the drive/control voltages $V_{DH}+V_C$, $V_{DH}-V_C$, $V_{DL}+V_C$, and $V_{DL}-V_C$ discussed earlier. As also discussed earlier, these signals are then applied to the drive tines 14 and 15 by the electrodes 33–37 and 48–52. In addition to helping induce drive mode vibration of the drive tines 14 and 15, the applied drive/control voltages $V_{DH}+V_C$, $V_{DH}-V_C$, $V_{DL}+V_C$, and $V_{DL}-V_C$ provide a control signal $V_C$–$(-V_C)$ that cancels the rotation induced and quadrature vibrations of the pickup tines 17 and 18.

Specifically, the rotation induced control elements of the control components $V_C$ and $-V_C$ of the applied drive/control voltages $V_{DH}+V_C$, $V_{DH}-V_C$, $V_{DL}+V_C$, and $V_{DL}-V_C$ cause oscillating electric fields and associated strains to be generated in the drive tines 14 and 15 that have opposite polarity to and cancel the oscillating strains generated in the drive tines 14 and 15 due to the Coriolis accelerations. And, the quadrature control elements of the control components $V_C$ and $-V_C$ cause oscillating electric fields and associated strains to be generated in the drive tines 14 and 15 that have opposite polarity to and cancel the oscillating strains generated in the drive tines 14 and 15 due to the quadrature creating accelerations of the drive tines 14 and 15. Thus, the control components $V_C$ and $-V_C$ applied to the drive tines 14 and 15 cause strains in the piezoelectric material of the drive tines 14 and 15 that are equal and opposite to the strains in the drive tines 14 and 15 caused by Coriolis accelerations and/or quadrature creating accelerations.

The net feedback (i.e., closed loop) effect is that vibration of the drive tines 14 and 15 in the YZ plane due to Coriolis accelerations and/or quadrature creating accelerations is canceled (i.e, nulled) so that the drive tines 14 and 15 are rebalanced to equilibrium in the YZ plane. Thus, any torsion of the body 19 of the tuning fork 11 created by Coriolis acceleration and/or quadrature creating accelerations is canceled and therefore not coupled to the pickup tines 17 and 18.

As a result, the rotation induced and quadrature vibrations of the pickup tines 17 and 18 in the YZ plane will be canceled as well so that the pickup tines 17 and 18 will be rebalanced to equilibrium. This will occur even when the tuning fork 11 is subject to a rotation about the Y axis.

FIGS. 6–8 show another embodiment of the rotation rate sensor 10. In this embodiment, the electrodes 69, 70, 75, 76, 83, 84, 86, and 87, the leads 81 and 88–90, and the charge amplifier 110 of the rotation rate sensor 10 of FIGS. 1–3 are replaced by a Michelson type interferometric optical sensing device 124 and the reflective gold plates or pads 122 and 123 located on the surfaces 125 and 126 of the pickup tines 17 and 18. Thus, the only real difference between the embodiments of FIGS. 1–3 and 6–8 is the way in which the pickup output signal $V_{PU}$ is produced. Otherwise, the rotation rate sensor 10 of this embodiment is configured and operates in the same ways as does the earlier described rotation rate sensor 10 of FIGS. 1–3.

FIG. 6 provides a block diagram of the optical sensing device 124. It includes a laser 128, three partially reflective beam splitters 129–131, a mirror 132, and a photodetector 133.

The laser 128 is the source of a laser beam (i.e., coherent light). In the preferred embodiment, the laser 128 has a nominal power of 1 mW and produces a laser beam having a wavelength of 780 nm.

The beam splitter 130 is used to split the laser beam into two equal intensity beams. One of the beams is directed to the gold plate 122 of pickup tine 17 and the other is directed to the beam splitter 129 which redirects this beam to the gold plate 123 of the pickup tine 18.

The gold plates 122 and 123 respectively reflect the beams directed at them back in the direction of the beam splitters 129 and 130. Since the beam splitter 130 is partially reflective it allows the beam reflected by the gold plate 122 to pass through it so that it is reflected by the mirror 132 in the direction of the beam splitter 131. The beam splitter 129 is also partially reflective and allows the beam reflected by the gold plate 123 to pass through it so that the beam splitter 131 reflects it and coherently recombines it with the beam reflected by the mirror 132.

The modulated optical intensity of the recombined beam will have a rotation induced component that represents the rotation induced vibration of the pickup tines and a quadrature component that represents the quadrature vibration of the pickup tines 17 and 18. The photodetector 133 senses the optical intensity and converts it to the pickup voltage signal $V_{PU}$.

In the interferometric arrangement of the optical sensing device 124, the average optical path difference between the split beams is approximately one-quarter wavelength. As a result, common-mode phase variations (phase noise or frequency jitter) in the recombined beam are effectively rejected. However, one skilled in the art will recognize that other interferometric arrangements with or without a small optical path difference may also be suitable for producing the pickup output signal $V_{PU}$.

The pickup output signal $V_{PU}$ is then provided directly to the synchronous demodulators 111 and 114 of the pickup/control electronics 91 of FIG. 4 or the loop filter 119 of FIG. 5. Thus, unlike the pickup electronics 91 of the rotation rate sensor 10 in FIGS. 1–3, the pickup circuit 91 of this embodiment does not require a charge amplifier. As a result, the pickup output signal $V_{PU}$ received by the synchronous demodulator 114 will not contain large levels of noise which typically are introduced by charge amplifiers.

The pickup/control electronics 91 of the embodiments of FIGS. 4 and 5 then produce the control voltage $V_C$, the rate output signal $V_R$, and the quadrature output signal $V_Q$ in the same manner as was described earlier.

FIGS. 9–11 show yet another embodiment of rotation rate sensor 10. The tuning fork 11 and the mounting structure 12 are configured and oriented in the same way as described earlier for the rotation rate sensors 10 of the embodiments of FIGS. 1–3 and 6–8. However, portions of the rotation rate sensor circuit 13 and portions of the electrode configuration of this embodiment are different than that of the embodiments shown in FIGS. 1–3 and 6–8.

Referring to FIGS. 10 and 11, located on the top and bottom surfaces 25 and 26 of drive tine 14 are respectively the two drive high electrodes 28 and 29, as in the earlier embodiments of rotation rate sensor 10. However, in this embodiment, there are respectively located on the side surfaces 46 and 54 of drive tine 15 two drive high electrodes 134 and 135.

The electrodes 28 and 134 are coupled together by the lead 136, the electrodes 134 and 135 are coupled together by the lead 137, and the electrodes 29 and 135 are coupled together by the lead 142. Thus, the lead 136 provides all of these electrodes with the drive high voltage $V_{DH}$.

Furthermore, respectively located on the top and bottom surfaces 61 and 62 of drive tine 15 are the two drive low electrodes 64 and 65, as is the case of the earlier described embodiments of rotation rate sensor 10. And, in this embodiment, there are respectively located on the side surfaces 30 and 39 of drive tine 14 two drive low electrodes 138 and 139.

The electrodes 65 and 139 are coupled together by the lead 140, the electrodes 138 and 139 are coupled together by the lead 141, and the electrodes 64 and 138 are coupled together by the lead 143. Thus, the lead 140 provides all of these electrodes with the drive low voltage $V_{DL}$ and provides the drive low current signal $I_{DL}$ to the drive electronics 92.

Moreover, the pickup high electrodes 69, 70, 75, and 76 and the pickup low electrodes 83, 84, 86, and 87 are configured, oriented, and coupled in the same way as described earlier for the embodiment of FIGS. 1–5. However, as will be explained shortly, in addition to being pickup electrodes, the electrodes 69, 70, 75, 76, 83, 84, 86, and 87 are also configured for use as control electrodes to cancel the rotation induced and quadrature vibrations of the pickup tines 17 and 18.

FIG. 9 provides a block diagram of the rotation rate sensor circuit 13 of this embodiment. It includes the drive electronics 92 and the pickup/control electronics 91.

In this embodiment, the drive high voltage $V_{DH}$ output by the AGC amplifier 98 of the drive electronics 92 is provided to the lead 136 and applied to the drive tine 14 by the electrodes 28 and 29 and applied to the drive tine 15 by the electrodes 134 and 135. In addition, the drive low voltage $V_{DL}$ is provided to the lead 140 and applied to the drive tine 15 by the electrodes 64 and 65 and applied to the drive tine 14 by the electrodes 138 and 139.

The applied drive high and low voltages $V_{DH}$ and $V_{DL}$ cause the drive mode vibration of the drive tines 14 and 15 in a similar manner to that described earlier for the embodiments shown in FIGS. 1–3 and 6–8. Thus, in response to the drive low current signal $I_{DL}$ picked up from the drive tines 14 and 15 with the drive low electrodes 64, 65, 138, and 139, the drive electronics 92 generates and outputs the drive high voltage $V_{DH}$ so as to keep the velocity of vibration of the drive tines 14 and 15 fixed.

As in the embodiment of FIGS. 1–3, the pickup low electrodes 83, 84, 86, and 87 apply the pickup low voltage $V_{PL}$ to the pickup tines 17 and 18. However, in this embodiment, it is more appropriate to view the pickup input signal that is picked up from the pickup tines 17 and 18 as an oscillating pickup high current $I_{PH}$ that represents the rotation induced and quadrature vibrations of the pickup tines 17 and 18. Thus, the pickup high electrodes 69, 70, 75, and 76 together pick up the pickup high current $I_{DH}$ in response to the rotation induced and quadrature vibrations and the pickup low voltage $V_{PL}$.

The pickup high current PH is provided to the pickup electronics 91 via the lead 81. In response, the portion of the pickup/control electronics of FIG. 4 or 5 produces the control voltage $V_C$, the rate output signal $V_R$, and the quadrature output signal $V_Q$ in the same manner as was described earlier.

Referring again to FIG. 9, the inverting amplifier 158 inverts the control voltage $V_C$ and the capacitor 160 in response outputs a control high voltage $V_{CH}$ on the lead 81. The control high voltage $V_{CH}$ and the pickup low voltage $V_{PL}$ provide a control signal $V_{CH}$-$V_{PL}$ that cancels the rotation induced and quadrature vibrations of the pickup tines 17 and 18.

Specifically, the pickup/control electronics 91 are further coupled to the lead 81 so that the pickup high electrodes 69, 70, 75, and 76 apply the control high voltage $V_{CH}$ to the pickup tines 17 and 18. The gain of the inverting amplifier 158 and the capacitance of the capacitor 160 are selected so that the net charge at the pickup high electrodes 69, 70, 75, and 76 is canceled. Thus, the electric fields and associated strains in the pickup tines 17 and 18 due to the rotation induced and quadrature vibrations are offset by the electric fields and associated strains in the pickup tines 17 and 18 caused by the applied control high voltage $V_{CH}$. As a result, the rotation induced and quadrature vibrations of the pickup tines 17 and 18 are canceled.

FIG. 15 shows a variation of the embodiment of the rotation rate sensor 10 of FIG. 9. In this embodiment, the pickup input signal still comprises a pickup high current $I_{PH}$ and a control voltage $V_C$ is still generated in a similar manner to that described earlier for the embodiment of FIG. 9.

But, in this embodiment, the control high voltage $V_{CH}$ is applied to the pickup tines 17 and 18 by the pickup low electrodes 83, 84, 86, and 87. Thus, the pickup high current $I_{PH}$ is generated in response to the rotation induced and quadrature vibrations of the pickup tines 17 and 18 and the control high voltage $V_{CH}$.

Furthermore, the inverting amplifier 158 is coupled to the lead 90 so that a control signal $V_{CH}$-$V_{PH}$ is applied to the pickup tines 17 and 18 across the pickup low electrodes 83, 84, 86, and 87 and the pickup high electrodes 69, 70, 75, and 76. Here, the pickup high voltage $V_{PH}$ is a virtual ground voltage since the lead 81 is coupled to one input of the charge amplifier 110 while the other input of the charge amplifier 110 is coupled to ground. Thus, the control signal $V_{CH}$-$V_{PH}$ comprises the difference between the control high voltage $V_{CH}$ applied by the pickup low electrodes 83, 84, 86, and 87 and the pickup high voltage $V_{PH}$ applied by the pickup high electrodes 69, 70, 75, and 76.

In this way, the control high voltage $V_{CH}$ applied to the pickup tines 17 and 18 cancels the pickup high voltage $V_{PH}$ detected from the pickup tines 17 and 18. As a result, the motion induced pickup mode and quadrature displacements of the pickup tines 17 and 18 are canceled.

Furthermore, there is a non-zero pickup capacitance between the pickup high electrodes 69, 70, 75, and 76 and the pickup low electrodes 83, 84, 86, and 87. In order to cancel the effect of the pickup capacitance, a summer 162 and an attenuator 164 are used. The attenuator 164 attenuates the control high voltage $V_{CH}$ to generate an attenuated control high voltage $V_{CH}'$. This attenuation is approximately the ratio of the pickup capacitance to the capacitance of the feedback capacitor of the charge amplifier 110. The attenuated control high voltage $V_{CH}'$ is summed with a raw pickup output voltage $V_{PU}'$ that includes a component due to the pickup capacitance. The summer 162 sums the raw pickup output voltage $V_{PU}'$ with the attenuated control high voltage $V_{CH}'$ to generate the pickup output signal $V_{PU}$ and remove the component due to the pickup capacitance.

The summer 162 may comprise a resistor and a buffer amplifier. The resistor is coupled between the output of the attenuator 164 and an input of the buffer amplifier that is also coupled to the output of the charge amplifier 110. In this way, the raw pickup output voltage $V_{PU}'$ on the output of the charge amplifier 110 is summed with the attenuated control high voltage $V_{CH}'$ on the output of the attenuator 164.

FIGS. 12–14 show still another embodiment of rotation rate sensor 10. In this embodiment, the rotation rate sensor 10 includes the interferometric optical sensing device 124 and the reflective gold plates 122 and 123 described earlier for the embodiment of FIGS. 6–8. In addition, it also includes the electrodes 69, 70, 75, 76, 83, 84, 86, and 87 of the embodiment of FIGS. 9–11.

Referring to FIG. 12, the optical sensing device 124 and the reflective plates 122 and 123 together produce the pickup output signal $V_{PU}$ in the way described earlier for the embodiment of FIGS. 6–9. Furthermore, referring also to FIGS. 4 and 5, the pickup/control electronics 91 outputs the control high voltage $V_{CH}$, the rate output signal $V_R$, and the quadrature output signal $V_Q$ in the same manner as was described for the embodiment of FIGS. 9–11.

However, in this embodiment, the electrodes 69, 70, 75, and 76 are coupled to the pickup/control electronics 91 via lead 81 so as to only apply the control high voltage $V_{CH}$ to the pickup tines 17 and 18. Moreover, the electrodes 83, 84, 86, and 87 are coupled to the pickup/control electronics 91 via the lead 90 so as to apply a control low voltage $V_{CL}$ in the form of a ground voltage to the pickup tines 17 and 18. Thus, the electrodes 69, 70, 75, and 76 serve as control high electrodes and the electrodes 83, 84, 86, and 87 as control low electrodes.

Moreover, since the control signal $V_{CH}$-$V_{CL}$ is applied to the pickup tines 17 and 18, the rotation induced and quadrature vibrations of the pickup tines 17 and 18 are canceled in a similar way to that described for the embodiment of FIGS. 9–11.

Since the rotation induced and quadrature vibrations of the pickup tines 17 and 18 are canceled in each of the embodiments described, the resonant frequency of the pickup mode vibration can be brought closer to the resonant frequency of the drive mode vibration. This allows the signal-to-noise ratio of the rotation rate sensor 10 to be improved without reducing bandwidth.

Furthermore, in each of the embodiments described, the pickup voltage signal $V_{PU}$ has a small pickup mode component and a small quadrature component. As a result, a phase error in the synchronous demodulator 114 in removing the small quadrature component of the pickup voltage signal $V_{PU}$ will only produce a small quadrature bias offset in the rate output signal $V_R$.

In addition, the electrode configuration in each of the embodiments described provides accurate canceling of the rotation induced and quadrature vibrations of the pickup tines over a wide range of rotation rates without resorting to excessively high voltages. Thus, the dynamic range of the rotation rate sensor 10 is significantly increased.

Moreover, the embodiments described do not require relocation of the drive electrodes. Thus, the coupling of the drive electrodes to the drive mode of vibration and the inhibiting of the coupling of the drive electrodes to undesired modes of vibration can be optimized.

The embodiments of FIGS. 6–8 and 12–14 that utilize an optical sensing device 124 eliminate the need of a charge amplifier. As a result, the noise introduced by a charge amplifier is also eliminated in these embodiments. Furthermore, while the optical sensing device 124 was discussed in relation to closed loop rotation rate sensors, it may be utilized with open loop rotation rate sensors that do not utilize control signals for canceling rotation induced and quadrature vibrations.

Moreover, although each of the embodiments have been described in the context of a rotation rate sensor with an H-shaped tuning fork, these embodiments are also applicable for use with any other motion sensor that utilizes a piezoelectric structure. For example, these embodiments may be implemented in a rotation rate sensor with a single ended tuning fork or an accelerometer with some type of piezoelectric structure used to sense accelerations.

While the present invention has been described with reference to a few specific embodiments, the description is illustrative of the invention and is not to be construed as limiting the invention. Moreover, various other modifications may occur to those skilled in the art without departing from the true spirit and scope of the invention as defined by the appended claims.

What is claimed is:

1. A sensor comprising:

a piezoelectric structure;

pickup electrodes disposed on the piezoelectric structure to detect an AC pickup signal from the piezoelectric structure in response to motion induced pickup mode and quadrature displacements of the piezoelectric structure;

pickup/control electronics coupled to the pickup electrodes to generate an AC control signal in response to the pickup signal;

the pickup electrodes also being coupled to the pickup/control electronics and disposed on the piezoelectric structure to apply the control signal to the piezoelectric structure so that the motion induced pickup mode and quadrature displacements of the piezoelectric structure are canceled.

2. A sensor as recited in claim 1 wherein:

the pickup signal comprises a pickup high current generated in response to the motion induced pickup mode and quadrature displacements and a pickup low voltage;

the control signal comprises the difference between a control high voltage and the pickup low voltage; and the pickup electrodes include:
pickup high electrodes to pickup the pickup high current from and apply the control high voltage to the piezolectric structure; and
pickup low electrodes to apply the pickup low voltage to the piezoelectric structure.

3. A sensor as recited in claim 2 wherein:

the pickup low electrodes include first pickup low electrodes that are disposed on first opposite surfaces of the piezoelectric structure and second pickup low electrodes that are disposed on second opposite surfaces of the piezoelectric structure; and the pickup high electrodes include first pickup high electrodes that are disposed on the first opposite surfaces of the piezoelectric structure opposing the first pickup low electrodes and second pickup high electrodes that are disposed on the second opposite surfaces of the piezoelectric structure opposing the second pickup low electrodes.

4. A sensor as recited in claim 1 wherein:

the pickup signal comprises a pickup high current generated in response to the motion induced pickup mode and quadrature displacements and a control high voltage;

the control signal comprises the difference between the control high voltage and a virtual ground voltage; and the pickup electrodes include:
pickup high electrodes to pickup the pickup high current from and apply the virtual ground voltage to the piezoelectric structure; and
pickup low electrodes to apply the control high voltage to the piezoelectric structure.

5. A sensor as recited in claim 4 wherein:

the pickup low electrodes include first pickup low electrodes that are disposed on first opposite surfaces of the piezoelectric structure and second pickup low electrodes that are disposed on second opposite surfaces of the piezoelectric structure; and the pickup high electrodes include first pickup high electrodes that are disposed on the first opposite surfaces of the piezoelectric structure opposing the first pickup low electrodes and second pickup high electrodes that are disposed on the second opposite surfaces of the piezoelectric structure opposing the second pickup low electrodes.

6. A rotation rate sensor comprising:

a piezoelectric tuning fork having drive tines and pickup tines;

pickup electrodes disposed on the pickup tines to detect an AC pickup signal from the pickup tines in response to rotation induced pickup mode and quadrature vibrations of the pickup tines; and pickup/control electronics coupled to the pickup/control electrodes and responsive to the pickup signal to generate an AC control signal;

the pickup electrodes also being coupled to the pickup/control electronics and disposed on the pickup tines to apply the control signal to the pickup tines so that the rotation induced pickup mode and quadrature vibrations of the pickup tines are canceled.

7. A sensor as recited in claim 6 wherein:

the pickup signal comprises a pickup high current generated in response to the rotation induced pickup mode and quadrature vibrations and a pickup low voltage;

the control signal comprises the difference between a control high voltage and the pickup low voltage; and the pickup electrodes include:
- pickup high electrodes to pickup the pickup high current from and apply the control high voltage to the pickup tines; and
- pickup low electrodes to apply the pickup low voltage to the pickup tines.

8. A sensor as recited in claim 7 wherein:

the pickup low electrodes include first pickup low electrodes that are disposed on opposite surfaces of a first one of the pickup tines and second pickup low electrodes that are disposed on opposite surfaces of a second one of the pickup tines; and the pickup high electrodes include first pickup high electrodes that are disposed on the opposite surfaces of the first one of the pickup tines opposing the first pickup low electrodes and second pickup high electrodes that are disposed on the opposite surfaces of the second one of the pickup tines opposing the second pickup low electrodes.

9. A sensor as recited in claim 8 wherein:

the pickup signal comprises a pickup high current generated in response to the rotation induced pickup mode and quadrature vibrations and a control high voltage;

the control signal comprises the difference between the control high voltage and a virtual ground voltage; and the pickup electrodes include:
- pickup high electrodes to pickup the pickup high current from and apply the virtual ground voltage to the pickup tines; and
- pickup low electrodes to apply the control high voltage to the pickup tines.

10. A sensor as recited in claim 9 wherein:

the pickup low electrodes include first pickup low electrodes that are disposed on opposite surfaces of a first one of the pickup tines and second pickup low electrodes that are disposed on opposite surfaces of a second one of the pickup tines; and the pickup high electrodes include first pickup high electrodes that are disposed on the opposite surfaces of the first one of the pickup tines opposing the first pickup low electrodes and second pickup high electrodes that are disposed on the opposite surfaces of the second one of the pickup tines opposing the second pickup low electrodes.

* * * * *